(12) United States Patent
Smith

(10) Patent No.: US 7,752,720 B2
(45) Date of Patent: Jul. 13, 2010

(54) SYSTEM FOR ATTACHING TRIM COVERS TO A FLEXIBLE SUBSTRATE

(76) Inventor: Lyle J. Smith, 1707 Nantucket La., Apt. No. 108, Charlotte, NC (US) 28270-3311

( * ) Notice: Subject to any disclaimer, the term of this patent is extended or adjusted under 35 U.S.C. 154(b) by 0 days.

(21) Appl. No.: 12/366,811

(22) Filed: Feb. 6, 2009

(65) Prior Publication Data

US 2009/0165263 A1    Jul. 2, 2009

Related U.S. Application Data

(63) Continuation of application No. 11/180,858, filed on Jul. 13, 2005, now Pat. No. 7,487,575.

(51) Int. Cl.
*B32B 3/06* (2006.01)
*A44B 99/00* (2010.01)

(52) U.S. Cl. .......................... 24/297; 24/453
(58) Field of Classification Search ................ 24/297, 24/453; 297/218.1, 218.2, 452.59, 452.6, 297/452.62; 248/68.1, 71, 73, 74.3; 5/402–406
See application file for complete search history.

(56) References Cited

U.S. PATENT DOCUMENTS

| | | | |
|---|---|---|---|
| 3,632,164 A | 1/1972 | Radke | |
| 3,649,974 A | 3/1972 | Baruth et al. | |
| 3,747,178 A | 7/1973 | Harder | |
| 3,794,378 A | 2/1974 | Haslam et al. | |
| 3,981,534 A | 9/1976 | Wilton | |
| 3,988,034 A | 10/1976 | Fister | |
| 3,995,892 A | 12/1976 | Hellman et al. | |
| 4,131,258 A | 12/1978 | Okuda et al. | |
| 4,467,987 A | 8/1984 | Small | |
| 4,637,178 A | 1/1987 | Nimmo et al. | |
| 4,663,211 A | 5/1987 | Kon | |

(Continued)

FOREIGN PATENT DOCUMENTS

CA    2165930 A1    6/1996

(Continued)

*Primary Examiner*—Robert J Sandy
(74) *Attorney, Agent, or Firm*—William A. Loginov; Loginov & Associates, PLLC

(57) ABSTRACT

This invention provides a system and method for attaching a trim cover to a flexible/resilient substrate, typically constructed from foam, which includes a plurality of clips that each has a base molded into the substrate. The bases each include a central "keyhole" slot that receives a corresponding key formed on a stem at a bottom of a clip projection. The clip projection defines a cavity for receiving a trim cover bead through a gap formed between a pair of legs that extend from the bottom. The stem has a length that is approximately the thickness of the slot. By passing the key through the slot and rotating the key to a locked position, the clip projection may be removably mounted to the substrate for repair or replacement as needed. The base may be constructed from a material that adheres effectively to the substrate, while the clip projection may be constructed from a material that exhibits high elasticity and wear-resistance. A cradle that includes a pair of upright posts that each confront a leg may be provided to progressively support the legs so as to prevent single point stresses from forming in the legs.

22 Claims, 14 Drawing Sheets

U.S. PATENT DOCUMENTS

| | | | |
|---|---|---|---|
| 4,673,542 A | 6/1987 | Wigner et al. |
| 4,691,883 A | 9/1987 | Kurihara |
| 4,861,104 A | 8/1989 | Malak |
| 4,881,997 A | 11/1989 | Hatch |
| 4,933,224 A | 6/1990 | Hatch |
| 4,988,282 A | 1/1991 | Fukui |
| 5,005,242 A | 4/1991 | Kennedy et al. |
| 5,013,090 A | 5/1991 | Matsuura |
| 5,023,125 A | 6/1991 | Gray |
| 5,028,472 A | 7/1991 | Gray |
| 5,110,649 A | 5/1992 | Morse et al. |
| 5,180,618 A | 1/1993 | Kessler et al. |
| 5,236,243 A | 8/1993 | Reyes |
| 5,259,905 A | 11/1993 | Gilcreast |
| 5,273,597 A | 12/1993 | Kumagai et al. |
| 5,286,431 A | 2/1994 | Banfield et al. |
| 5,326,151 A | 7/1994 | Smith et al. |
| 5,338,092 A | 8/1994 | Wiltsey et al. |
| 5,342,569 A | 8/1994 | Murasaki |
| 5,401,075 A | 3/1995 | Venuto et al. |
| 5,459,907 A | 10/1995 | Nivet |
| 5,582,463 A | 12/1996 | Linder et al. |
| 5,604,958 A | 2/1997 | Anscher |
| 5,605,373 A | 2/1997 | Wildern et al. |
| 5,641,552 A | 6/1997 | Tillner |
| 5,658,046 A | 8/1997 | Rus |
| 5,718,478 A | 2/1998 | Allison |
| 5,733,001 A | 3/1998 | Roberts |
| 5,766,723 A | 6/1998 | Oborny et al. |
| 5,786,061 A | 7/1998 | Banfield |
| 5,827,546 A | 10/1998 | Burchi et al. |
| 5,827,547 A | 10/1998 | Burchi et al. |
| 5,882,073 A | 3/1999 | Burchi et al. |
| 5,900,303 A | 5/1999 | Billarant |
| 6,406,093 B1 | 6/2002 | Miotto et al. |
| 6,431,585 B1 | 8/2002 | Rickabus et al. |
| 6,592,181 B2 | 7/2003 | Stiller et al. |
| 6,612,525 B2 | 9/2003 | Bagdi |
| 6,656,563 B1 | 12/2003 | Leach et al. |
| 6,899,399 B2 * | 5/2005 | Ali et al. ................ 297/452.6 |
| 2003/0215601 A1 * | 11/2003 | Pedde et al. ............ 297/452.13 |
| 2006/0242802 A1 * | 11/2006 | Scroggie ...................... 24/297 |

FOREIGN PATENT DOCUMENTS

| | | |
|---|---|---|
| CA | 2368739 A1 | 7/2002 |
| CA | 2420373 AA | 8/2003 |
| CA | 2427371 A1 | 11/2003 |
| DE | 4446450 C1 | 4/1996 |
| DE | 19530397 A1 | 2/1997 |
| DE | 29821697 U1 | 3/1999 |
| DE | 29917372 U1 | 2/2000 |
| DE | 19949423 C1 | 12/2000 |
| DE | 19959235 A1 | 6/2001 |
| EP | 0532820 A1 | 3/1993 |
| EP | 0433100 B1 | 4/1994 |
| EP | 0439969 B1 | 7/1994 |
| EP | 0537333 A1 | 9/1995 |
| EP | 0708000 A2 | 4/1996 |
| EP | 0727294 A1 | 8/1996 |
| EP | 0667257 B1 | 7/1998 |
| EP | 0720900 B1 | 3/1999 |
| EP | 0960782 A1 | 12/1999 |
| EP | 0990554 A1 | 5/2000 |
| EP | 1000855 A2 | 5/2000 |
| EP | 1116450 A2 | 7/2001 |
| EP | 0900030 B1 | 7/2002 |
| EP | 1243462 A2 | 9/2002 |
| EP | 0990546 B1 | 3/2003 |
| EP | 1300229 A1 | 4/2003 |
| EP | 0960783 B1 | 6/2003 |
| EP | 1358826 A1 | 11/2003 |
| EP | 0960782 B1 | 1/2004 |
| EP | 1000856 B1 | 1/2004 |
| EP | 1220628 B1 | 5/2004 |
| GB | 1560234 B1 | 1/1980 |
| GB | 2238708 A1 | 6/1991 |
| WO | 8603164 A1 | 6/1986 |
| WO | WO9219119 | 11/1992 |
| WO | 9501741 A1 | 1/1995 |
| WO | 9720690 A1 | 6/1997 |
| WO | 9805232 A1 | 2/1998 |
| WO | 9820766 A1 | 5/1998 |
| WO | WO0071382 A1 | 11/2000 |
| WO | 0100386 A1 | 1/2001 |
| WO | 0124665 A1 | 4/2001 |
| WO | 0189338 A2 | 11/2001 |
| WO | 0205686 A2 | 1/2002 |
| WO | 03031223 A1 | 4/2003 |
| WO | 03058005 A2 | 7/2003 |
| WO | 03059111 A1 | 7/2003 |
| WO | 03070509 A2 | 8/2003 |
| WO | 03072390 A1 | 9/2003 |
| WO | 2004058496 A1 | 7/2004 |

* cited by examiner (Piror Art)

(Piror Art)

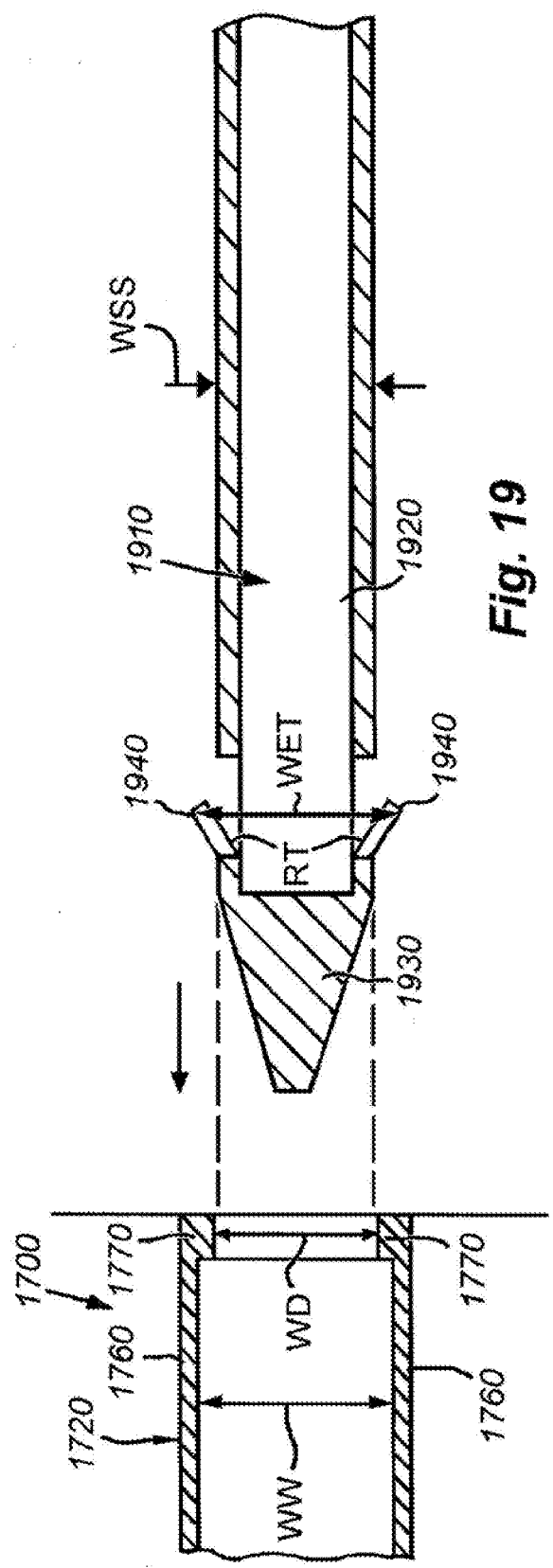

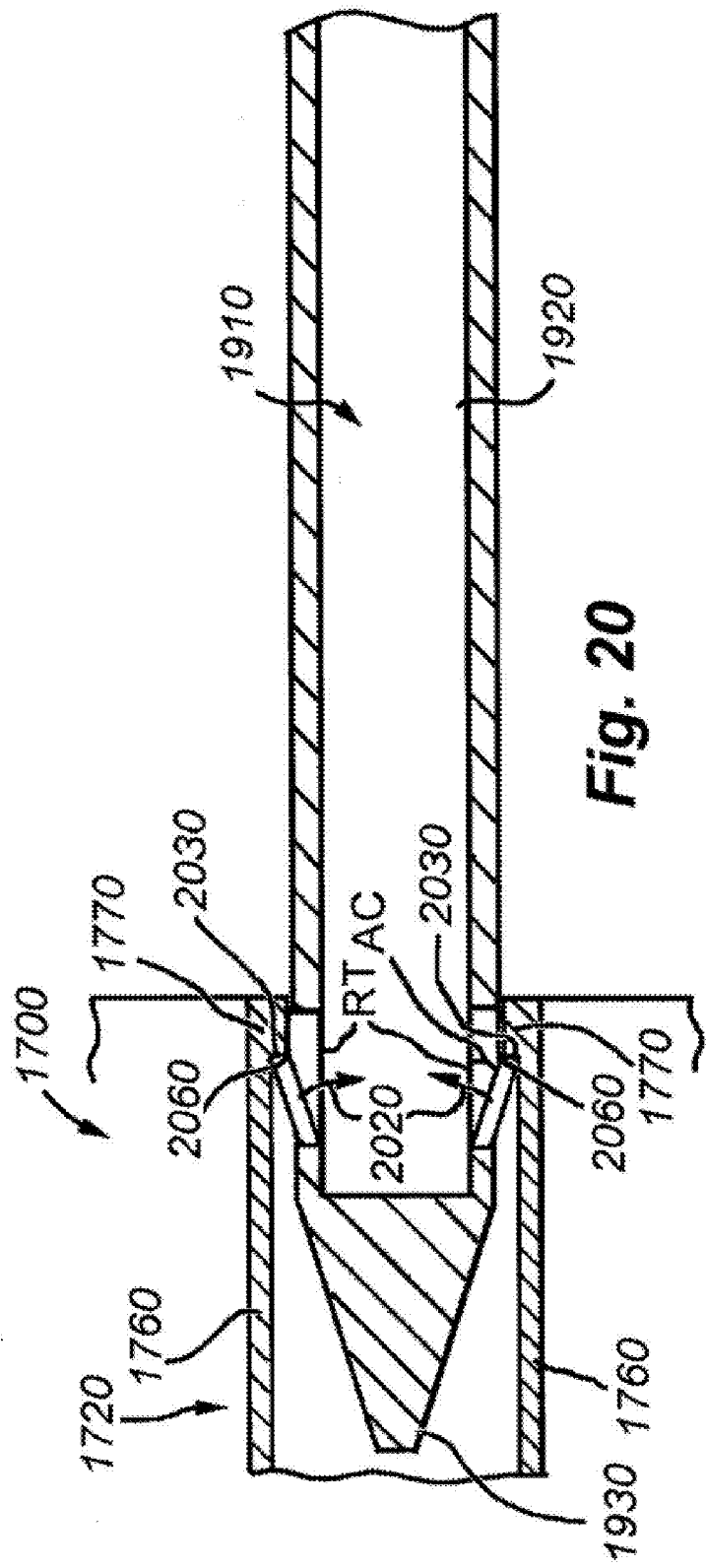

SYSTEM FOR ATTACHING TRIM COVERS TO A FLEXIBLE SUBSTRATE

RELATED APPLICATIONS

This application is a continuation of Ser. No. 11/180,858, filed Jul. 13, 2005, now U.S. Pat. No. 7,487,575 entitled SYSTEM FOR ATTACHING TRIM COVERS TO A FLEXIBLE SUBSTRATE, the entire disclosure of which is herein incorporated by reference.

BACKGROUND OF THE INVENTION

1. Field of the Invention

This invention relates to trim and upholstery attachment mechanisms, and more particularly to clips for attaching trim and upholstery to foam and other resilient or flexible substrates.

2. Background Information

Modern fabric trim covers (upholstery), such as those used in vehicles, often carefully sculpted and shaped to produce a comfortable and aesthetically pleasing effect. As such, the fabric (typically cloth, vinyl or leather with an appropriate backing material) is secured at many locations along its surface to a resilient or flexible backing that defines the cushioned substrate of the upholstered item (for example, a seat bottom). The substrate is typically constructed from a resilient material. This resilient/flexible material can be synthetic foam (for example polyurethane or isocyanate-based foam) or another cushioning material, such as traditional rubberized horsehair. In general, the close-fitting appearance of the upholstery to the substrate requires that the fabric be tacked down to the substrate at any intermediate dips, Vees or trenches in the surface. Otherwise, the fabric will tend to billow or "tent" at these non-planar surface features.

Traditional methods for tacking down trim covers at dips/Vees entails the use of a plastic bead along the inner side of the trim cover. This bead is often located at an inner seam that is a sewn or welded joint between fabric pieces. Likewise the foam substrate includes an exposed metal wire that may be molded into the substrate along a trench in its surface during its construction. So-called "hog-rings," consisting of bendable metal ringlets, are then secured to both the plastic bead and the metal wire. These rings are each applied by a tool, such as a hog-ring gun from a supply of wire. As each hog-ring is secured, it forms an immovable, permanent joint between the fabric and the substrate. Clearly, this permanent joint is difficult to repair if needed and requires significant skill to create in the first place. In addition, the use of metal components may be undesirable where the seat includes electrical heating elements due to the metal's predisposition to conduct both heat and electricity.

More recently, trim covers have been secured to resilient substrates using detachable connections that allow repairs to be effected and are often more-easily applied without the used of highly skilled labor. In one example, one side of a hook and loop fastener is attached to a trench in the resilient substrate. The inner surface of the trim cover carries the opposing side of the fastener. This approach is reliable, but inexpensive, in terms of material wasted and consumed to attain a secure fit. It also requires a rather large-width trench to be formed in the resilient substrate to ensure a sufficient area of engagement between fastener sides.

Another recent approach involves the used of a series of clips that are molded into the trench as a foam substrate is manufactured. A version of this structure, and other prior art attachment mechanisms, are described in U.S. Published Patent Application US/2003/0215601 A1, entitled ATTACHMENT DEVICE, dated Nov. 20, 2003, by Peede, et al. the teachings of which are expressly incorporated herein by reference. A simplified version of such a clip and its use are shown in FIGS. 1-3 herein. As shown particularly in FIGS. 1 and 2, each clip 100 includes a pair of outwardly facing (with respect to the trim-cover-facing surface of the substrate) legs 102 that together form a female projection 104 with a pair of upper hooks or barbs 106 that face toward each other, thereby defining a top-end funnel, leading into a cavity 110. The barbs 106 define a narrow gap 112 therebetween. This gap 112 is smaller in width than the width of the cavity 110. The material and relative thickness of the legs 102 is such that the barbs 106 can be spread elastically apart so that an appropriately sized cylinder can pass between the legs to be thereafter trapped in the cavity against outward movement by the sprung-back barbs 106. In this case, the cylinder is the covered plastic or metal bead 120 attached to a seam 122 between two trim cover fabric pieces 124 and 126. In this example, the bead 120 is surrounded by a piece of non-woven covering 130 that retains the bead against the bottom of the seam 122 using stitching 132 (or another attachment mechanism). Collectively the diameter of the bead 120 and covering 130 define an outer diameter ODB approximately equal to, or slightly less than, the lateral width WB of the cavity 110. Thus, in operation, an installer need only press the bead 120 down between the barbs 106 (arrow 140) so that the angled funnel tops of the barbs cause the legs 102 to spread, allowing the bead 120 to pass therebetween. Once the bead 120 passes fully between the barbs 106, then the bead 120 is mechanically retained beneath the barbs 106 within the cavity, and the seam 122 (and facing cover 130), extend through the gap 112 to hold that particular part of the trim cover (124 and 126) against the clip 100.

The clip includes a base 150 having a relatively thin cross section and an increased surface area adapted to act as an anchor within the (foam) substrate material 252. As shown (FIG. 2), the base is disposed beneath the surface of a trench 254. The base is locked into the matrix of the substrate as a result of the molding process in which foam covers the base and adheres to the base's material. Typically, the clip 100 is mounted in the bottom of a trench 254 as shown. In this manner, sufficient setback is provided to allow the seam 122 to sink into the substrate for a taut fit against its surface.

FIG. 3 shows an exemplary vehicle seat foam cushion 310 according to the prior art. A plurality of clips 100 are located along the trench at an appropriate degree of spacing so as to ensure that the bead of the trim cover defines a continuous, unsegmented shape. In the example of a seat bottom or back, approximately 12-30 clips may be needed to define a desired shape. In general, the tighter the curvature of the substrate, the smaller the clip spacing provided. The above-referenced published U.S. patent application contemplates that the spacing between clips can be regulated, in part, by providing fixed-space, flexible connectors between individual clips and molding such clips into the foam substrate with the predetermined spacing defined by the connectors.

The above-prior art clips typically constructed from a resilient material, which allows for the flexure imparted by insertion of the bead into their respective cavities. However, these clips should also adhere firmly to the foam or other resilient substrate material. Hence, the clip material should exhibit properties so that it appropriately adheres to the substrate so that it will not eventually detach under long-term use.

In molding the clip to the substrate, the clip is exposed to significant heat, which may weaken the clip material. In addition, because the clip material is adapted to adhere to securely to the substrate material, it may not be ideally suited to flexure or cyclic loading. In general the choice of clip material entails a compromise between mechanical properties and foam-adhesive properties. Likewise, if a clip is damaged during installation or thereafter, then entire foam substrate must generally be discarded as defective. This is because the clip is permanently mounted to the substrate, and typically cannot be removed and/or replaced without significantly damaging the substrate's surface. Naturally, a brittle clip composed of a heat-damaged and/or compromised material is more likely to be broken during installation or use.

In view of these disadvantages, it is highly desirable to provide a clip that is constructed from material(s) that are both optimized for foam/substrate adherence and long-term mechanical strength. Such clips should be reparable without need to alter or damage the underlying substrate.

SUMMARY OF THE INVENTION

This invention overcomes the disadvantages of the prior art by providing a system and method for attaching a fabric trim cover to a flexible/resilient substrate, typically constructed from foam, that includes a plurality of clips that each has a base molded into the substrate. The bases each include a central "keyhole" slot that receives a corresponding key formed on a stem at a bottom of a clip projection. The clip projection defines a cavity for receiving a trim cover bead through a gap formed between a pair of legs that extend from the bottom. The stem has a length that is approximately the thickness of the slot. By passing the key through the slot and rotating the key to a locked position, the clip projection may be removably mounted to the substrate for repair or replacement as needed. The base may be constructed from a material that adheres effectively to the substrate, while the clip projection may be constructed from a material that exhibits high elasticity and wear-resistance.

In one embodiment, a circular recess is formed on the rear side (facing away from the clip projection) of the base, around the slot. The recess includes a pair of detents that receive opposing ends of the key when the key is rotated relative to the slot. The recess receives a snap-on cap that prevents foam from entering and/or clogging the area around the slot during the molding process. The bases can include one or more end detents for receiving U-shaped clamps formed on the ends of elongated connectors of various lengths. In one embodiment, detents are provided on each of opposing sides of the base and the connectors include a clamp on each opposing end so that chains of bases of varying spacing can be created and disposed within the substrate during the molding process. Alternatively, bases can be attached connectors of various lengths that are fixed at both ends. Similarly, bases can be provided with a fixed connector at one end and a detent at the opposite end. The fixed connectors can define a desired length and include a clamp at the opposing end for locking on to the detent of another base. In this manner, one assembles bases having connectors attached thereto with the desired length to for an appropriately spaced chain of bases.

To prevent excessive, plastically deforming flexure of the clip projection legs a cradle that includes a pair of reinforced uprights are mounted outwardly from each leg at a predetermined spacing from the respective leg that allows sufficient flexure for a trim cover bead to pass through the barbs at the top of the legs, but that restricts flexure significantly beyond this point. In general, the cradle may/does progressively support the legs so as to prevent single point stresses from forming in the legs. An optional, removable covering cap may be provided to cover the uprights and legs so that these elements remain free of significant foam infiltration during the molding process. Another optional feature is a pair of downwardly projecting anti-rattle tabs that extend at an acute angle from the lower portion of each leg's inner wall. These tabs flex slightly to engage a side of the trim cover bead and/or an associated bead cover piece. The tabs suppress and/or prevent excessive rattle or play for the bead when mounted within the clip.

In another embodiment the bases can include one or more socket structures having a rectangular cross section and a pair of inwardly offset shoulders for receiving spring-loaded tabs formed on the end of a connector. The structure plugs into the socket, whence the taps expand after compressing during passage into the socket and lock against the inner abutments of the offset shoulders. This structure generally prevents pullout of the connectors, but otherwise allows the ends of connectors to rotate and flex with respect to bases within a predetermined range of movement.

BRIEF DESCRIPTION OF THE DRAWINGS

The invention description below refers to the accompanying drawings, of which:

FIG. 19 is an exploded top view of the socket of FIG. 17 with a connector end being inserted/plugged thereinto; and FIG. 20 is a top partial cross section of the socket of FIG. 17 with the connector of FIG. 19 inserted thereinto.

DETAILED DESCRIPTION OF ILLUSTRATIVE EMBODIMENTS

Figure 1:
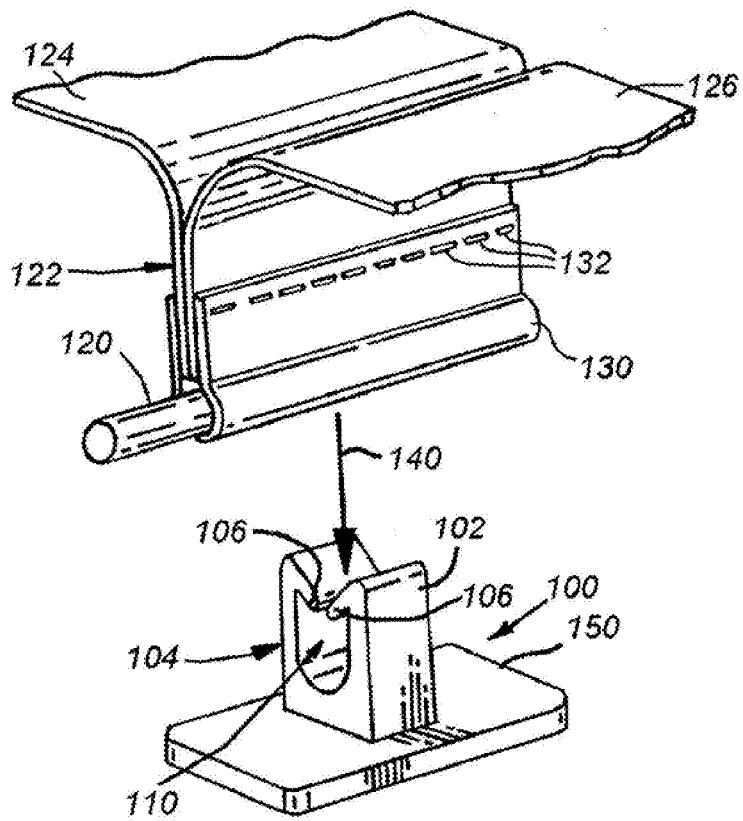
FIG. 1, already described, is an exploded fragmentary perspective view of a trim cover bead and clip according to the prior art.
Figure 2:
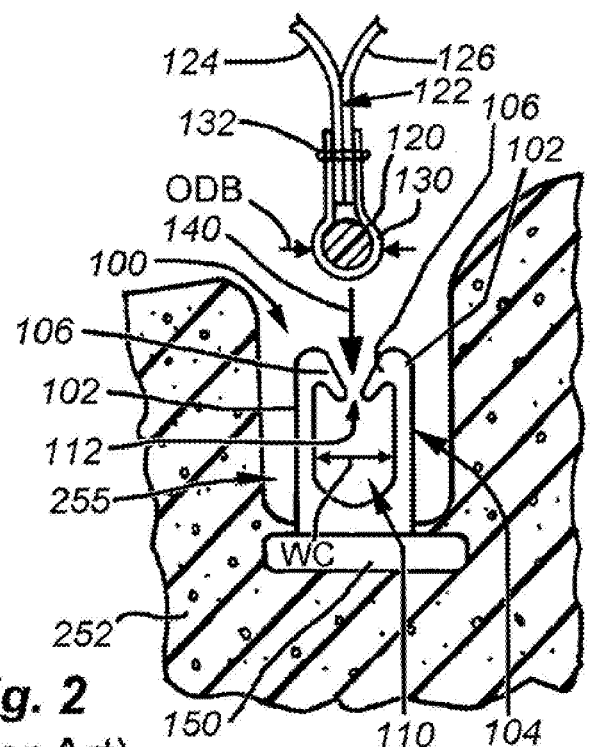
FIG. 2 is, already described, is a fragmentary side cross section of the clip and trim cover bead of FIG. 1 mounted in an exemplary substrate trench.
Figure 3:
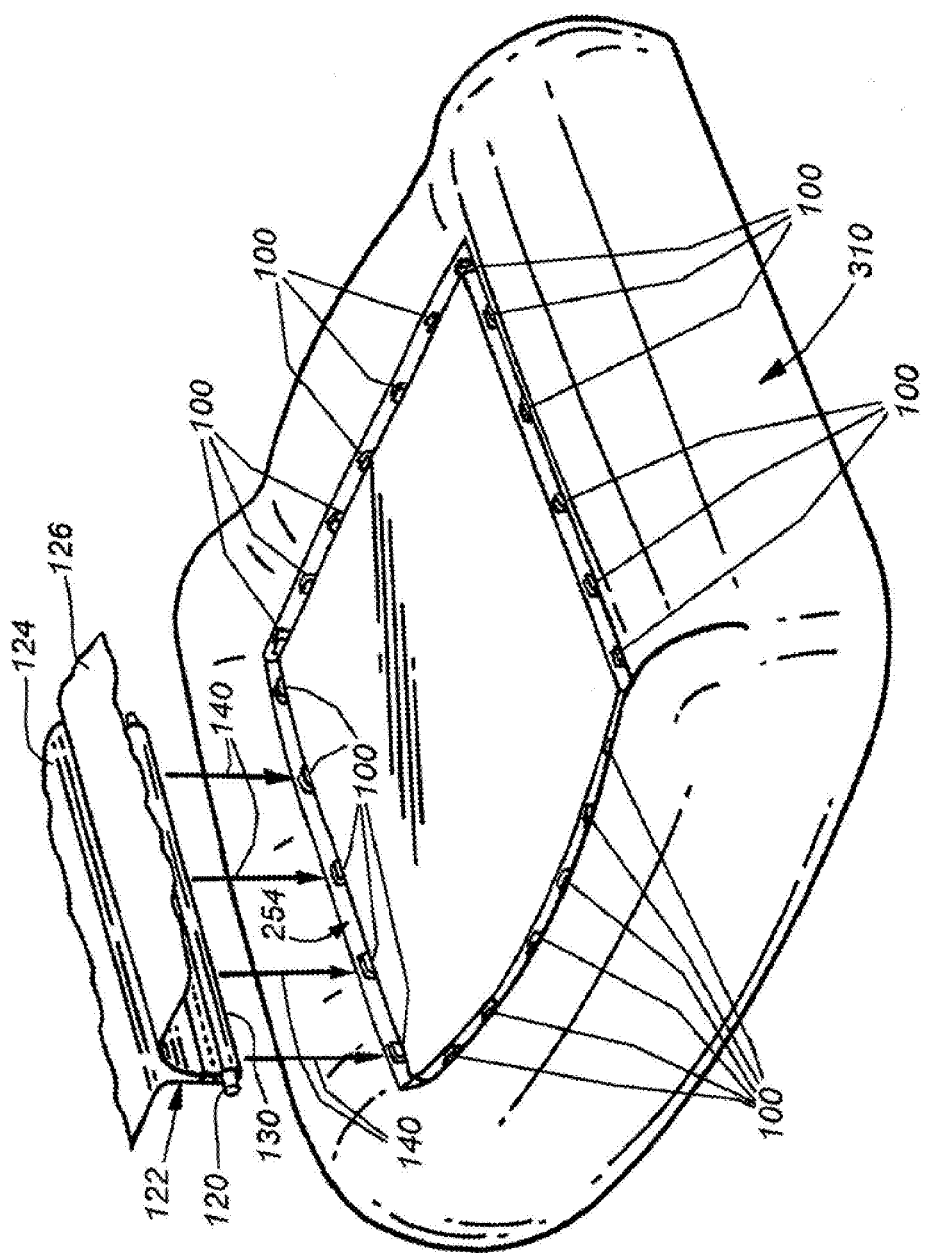
FIG. 3, already described, is a fragmentary perspective view of an exemplary substrate (a seat bottom) having a surrounding inboard trench with a plurality of clips molded thereinto and receiving a piece of a trim cover bead.

FIG. 1 details a pair of "chained" or "ganged" clips according to an embodiment of this invention. Each of the clips 410 is an independent unit connected to a flexible, elongated connector 412 that will be described in detail below. In general, clips 410 may be connected in any number using connectors of varying size to create and appropriately spaced chain of connectors for application to a molded resilient substrate (such as an automotive seat bottom or back). Each clip 410 includes a thin-cross-section, enlarged-surface-area base (also termed a "top") 414 that is designed to seat within the substrate when hardened. The base is formed from a polymer material that may be particularly suited to provide good adhesion and chemical reaction bonding to the substrate material (typically polyurethane or isocyanate-based foam). Acceptable polymer materials for the base include, but are not limited to, nylon, polyester or any other thermoplastic that has the capability of surviving temperature and environmental variations over an expected range. To enhance security within the substrate/foam matrix, the base includes a plurality of through-cut holes located about its perimeter. These holes 416 enable the liquid matrix to flow therethrough and eventually harden into an anchoring lattice.

The base perimeter of each clip is generally circular in this example, but includes a pair of opposing flats at each of a first end 420 and an opposing second end 422. These flats allow attachment of the above-referenced connectors (412) and include detents 430 for removably receiving U-shaped end snaps 432 on the connector 412. The flats on each base end 420, 422 also serve to register the rotational orientation of the bases, particularly when they are provided independently to the substrate without a connector. As will be described below, proper registration of the clip bases is needed to ensure that the clips are properly aligned with respect to a substrate trench and trim cover bead that will be applied to the substrate alter hardening of its foam matrix has completed. The flats also facilitate use of a jig or automated placement device to provide clips to the substrate.

Each base 414 supports a bead-engaging clip projection 450 according to an embodiment of this invention. Each clip projection 450 includes a bottom or tab that engages the base. A pair of legs 454 extends outwardly from the bottom 452. These legs define a cavity 456 into which a trim cover bead is trapped. The cavity is accessed through a narrowed gap 458 that is spread by forcibly passing the bead therethrough, to thereby flex the legs 454. The structure of the clip projection 450 is also described in further detail below.

In this embodiment, the clip projections are formed from a material that may be different from (dissimilar from) the base material. That is, the clip projection material may be optimized for strength, resilience and/or durability rather than its adhesive properties. Appropriate materials from which the clip projection 450 may be formed include, but are not limited to, impact-modified nylon, polyester, impact-modified polyester, polycarbonate, polyacetate, or another durable polymer having desired mechanical properties. In this manner, the traditional tradeoff between substrate adhesive properties and strength is unnecessary, and each part of the clip 410 may be best suited to its particular duty.

Figure 5:
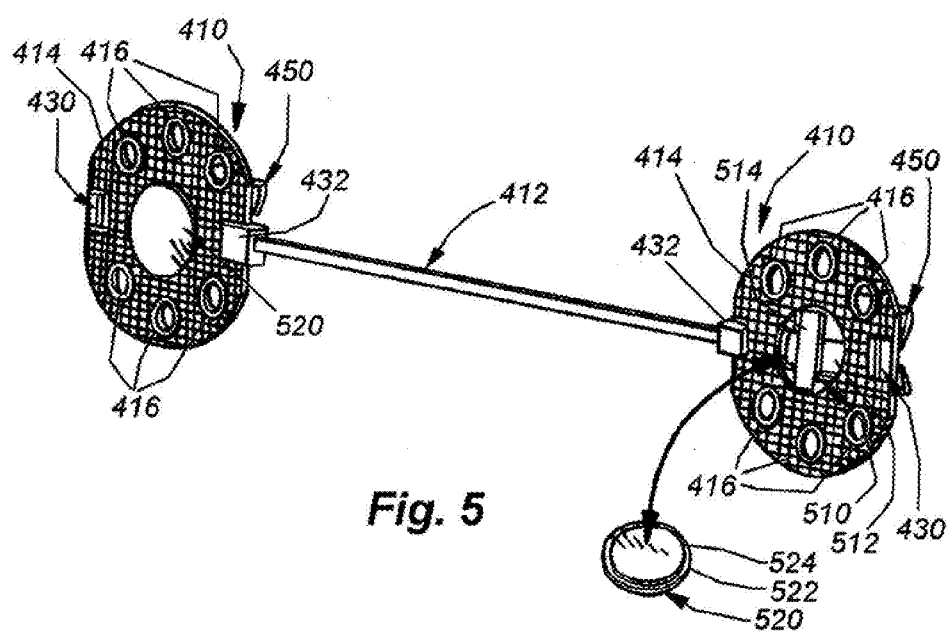
FIG. 5 is a bottom perspective view of the pair of chained clips of FIG. 1 detailing removable recess-covering caps.

Because materials are dissimilar, one approach to allowing their combination into a finished clip is to provide a clip projection that is removably attachable to the base. Thus, as shown in the bottom perspective view of FIG. 5, the base 414 includes a central recess 510 that includes a rectangular, through-cut keyhole 512. As described further below, the keyhole is sized and arranged to receive a key 514 that projects from the bottom 452 of the clip projection 450. The recess 510 and key 514 are adapted to rotate from an insertion position, in which the key 514 passes through the slot, to a stopped position, in which the key is fully rotated (usually 90 degrees offset from the keyhole 512) within the recess, bringing the legs 454 of the clip projection 450 into proper alignment with respect to the ends 420, 422 of the base. When the key 514 is fully rotated, the recess 510 blocks the opposing ends of the key 514 and thereby prevents pullout of the clip projection 450 from the base. As described below, locking detents are provided in the recess to prevent inadvertent reverse rotation of the key 514 once it is in the stopped position.

It should be clear that this arrangement allows for assembly of clips projections and bases before and after the molding process. In this manner, broken or unwanted clip projections may be easily removed and/or replaced at any time. To prevent the liquid substrate matrix from undesirably clogging and/or interfering with the keyhole 512 and key 514 (thereby ensuring replacability of clip projections), the recess 510 may be covered with a snap-on cap 520. In this illustration one cap is shown attached and the other is shown removed. The cap 520 can be formed from any acceptable material including the same material as the base 414. The cap is circular in this example, although any shape or reasonable size may be employed. The cap 520 includes an extended-diameter flange 522 that is adapted to overlap the perimeter edge of the recess 510. The cap includes a cylindrical snap extension 524 that is inserted into the recess to form an interference fit into against the inner wall of the recess. Appropriate lips and other surface shapes (not shown) can be provided to the extension 524 and corresponding recess inner wall to facilitate a more-secure snap fit where desired. The cap 520 is sized and arranged to allow the key 514 to rotate in the recess 510 without interference. Thus, in practice, caps may be pre-installed on bases when they are delivered for application to the substrate.

Where dissimilar materials are employed, another approach to manufacture that may limit or prevent reparability is to for the complete clip using a so-called "two-shot" molding technique in which the base or clip projection is formed within a first mold cavity using a first material. This first part of the clip then hardens. Thereafter, a second mold cavity is applied to the hardened first part of the clip (or is already present thereon), and this second mold cavity is filled with a second material that flows around the hardened first part. In general, the two parts will adhere to each other to a great extent, limiting the ability for the parts to later detach. However, in certain advanced two-part molding techniques it is contemplated that detachability between the parts can be provided. Even where parts are not detachable, this approach has the advantage of enabling optimum materials to be provided to each part of the clip, namely a foam-adhesive base and a mechanically strong clip projection.

Figure 4:
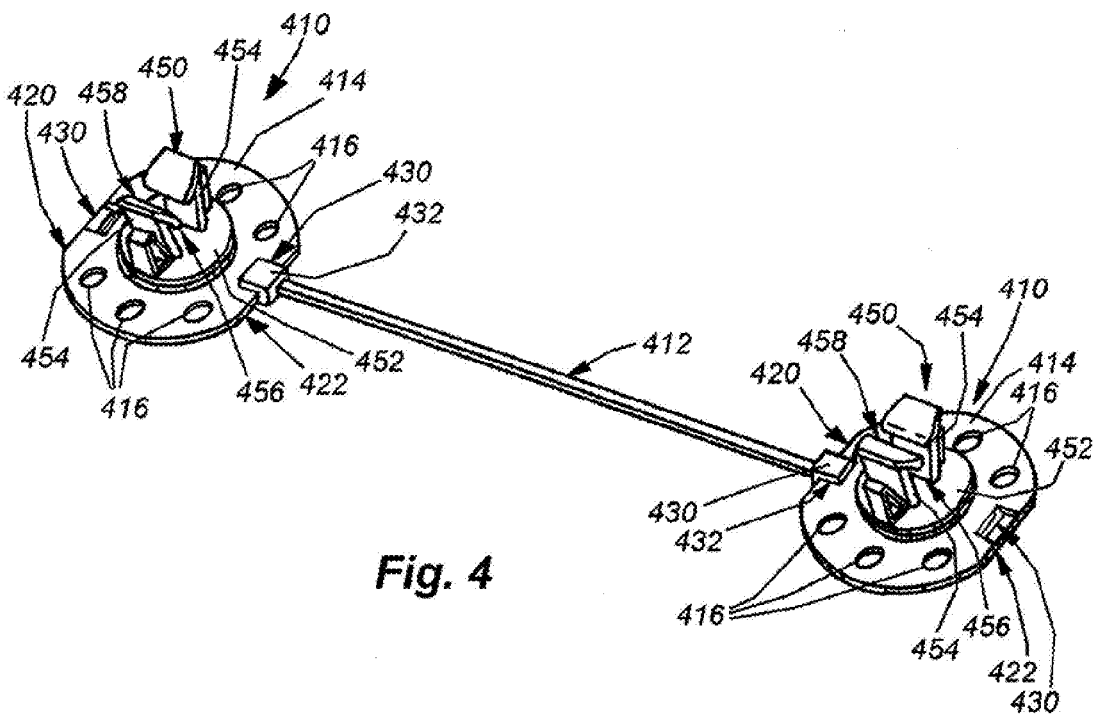
FIG. 4 is a top perspective view of a pair of chained clips according to an embodiment of this invention, joined by a removable connector of predetermined length.
Figure 6:
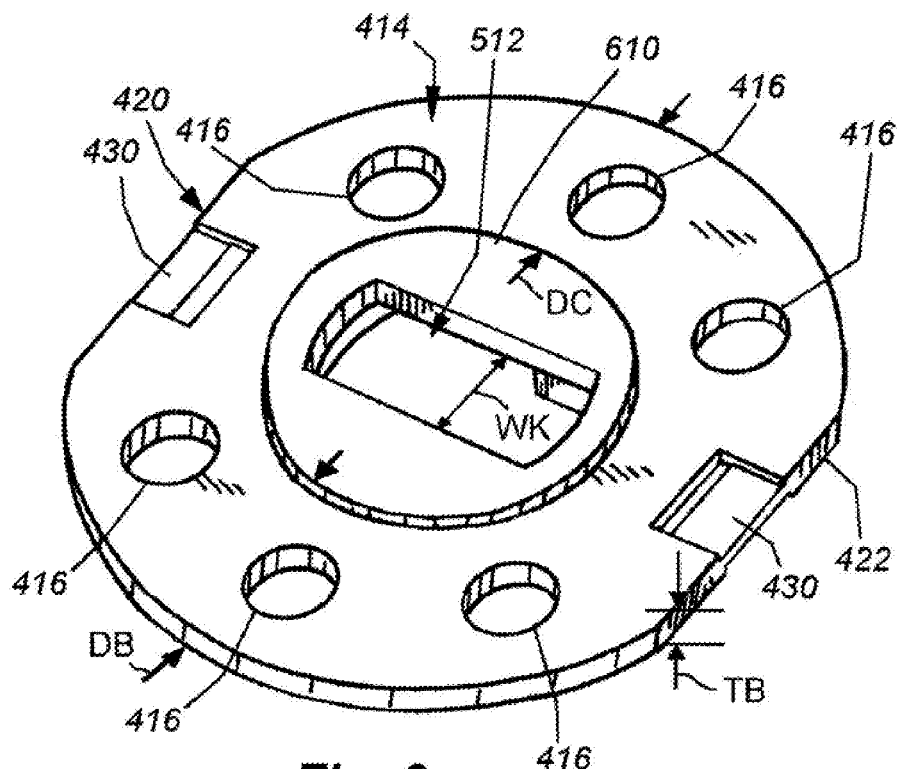
FIG. 6 is a top perspective view of a clip base according to the embodiment of FIG. 4 with clip projection removed.
Figure 7:
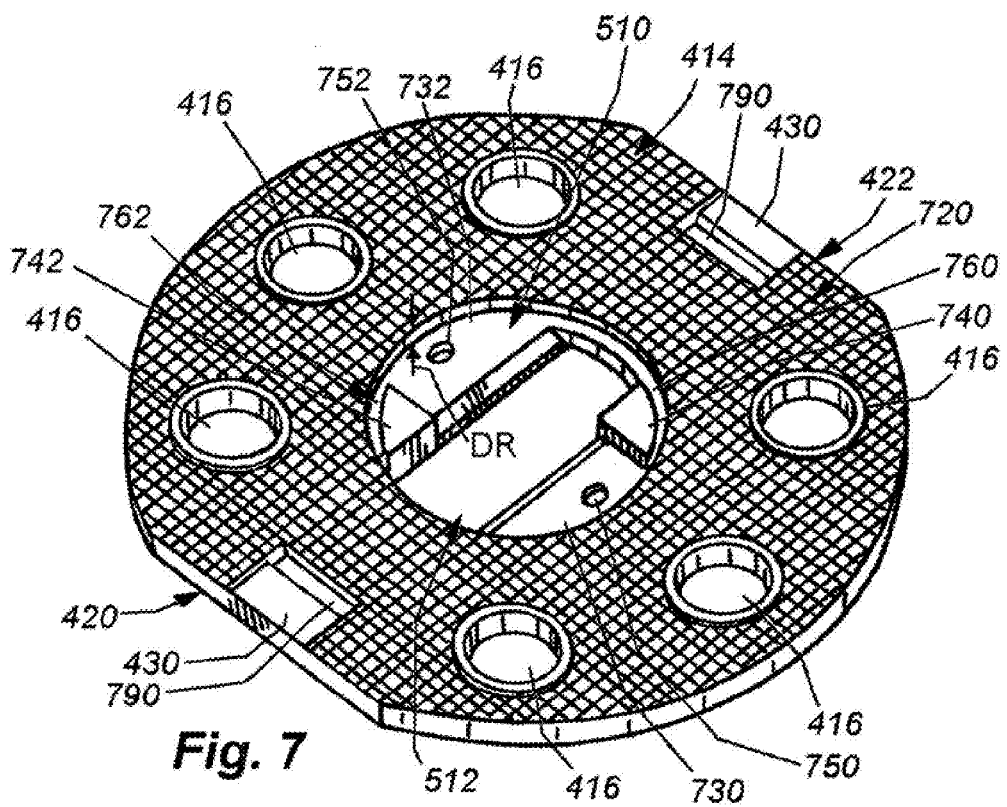
FIG. 7 is a bottom perspective view of the clip base of FIG. 6.

Having described general features and characteristics of the clips of an illustrative embodiment, particular details of various clip components are now further described. FIGS. 6 and 7 show the base 414 in top and bottom views, respectively with the above-described clip projection removed. By way of example, and to provide the reader with a relative scale, the base 414 has an approximate diameter DB of 30 millimeters. However, this is widely variable depending upon the application. Likewise, the base's thickness is approximately 1-2 millimeters in this example, which is also widely variable. The center 610 of the base is raised by approximately 1-2 millimeters (see FIG. 6) in order to provide an adequate material thickness to support the clip projection's bottom 452 (FIG. 4). The diameter DC of the center is approximately 15 millimeters, matching the approximate diameter of the clip projection bottom 452. The raised center 610 compensates in part for the recess 510 (see FIG. 7) along the underside face 720 of the base. The recess 510 has a depth DR below the surface 720 of approximately 1-2 millimeters, allowing for a key (514 in FIG. 5) of approximately 1-2 millimeters in thickness. The keyhole 512 has a width WK of approximately 5 millimeters in this example, also allowing for a key width of approximately 5 millimeters (the key width being slightly narrower than the hole to provide clearance).

The surface finish of the base 414 is strategically textured in this example to facilitate foam adhesion. Likewise, the bottom surface 720 (and/or top surface where desired) can be formed with a checkered or stippled texture to further facilitate adherence and resist shear once molded into the foam substrate. As described further below, the recess 510 (see FIG. 7) includes a pair of opposing slide surfaces 730, 732 on opposite sides of the keyhole 512 that allow rotation of the key therealong. The slide surfaces 730 and 732 are interrupted by raised stops 740, 742 that are located to prevent rotation of the key 514 beyond the stopped position. In this example, the stopped position is 90 degrees rotationally offset from the key-entry position through the keyhole 512. A pair of detents 750, 752 is located to engage corresponding nipples (see nipples 810, 812 in FIGS. 8 and 10 below) on the key when the key is fully rotated to the stopped position. This engagement of detents and nipples resists inadvertent rotation of the key out of the stopped position.

Additionally, note in FIG. 7 that each raised stop 740 and 742 is slightly spaced (gaps 760, 762) from the inner perimeter wall of the recess 510. This spacing facilitates clearance for the cylindrical snap extension 524 of the cap 520.

Figure 8:
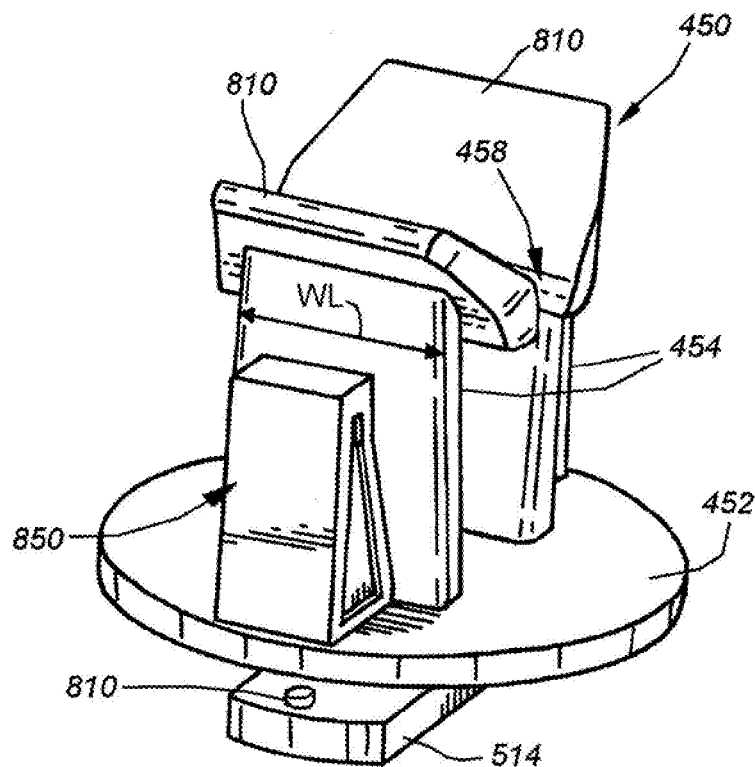
FIG. 8 is a top perspective view of a clip projection according to the embodiment of FIG. 4 removed from the clip base.
Figure 9:
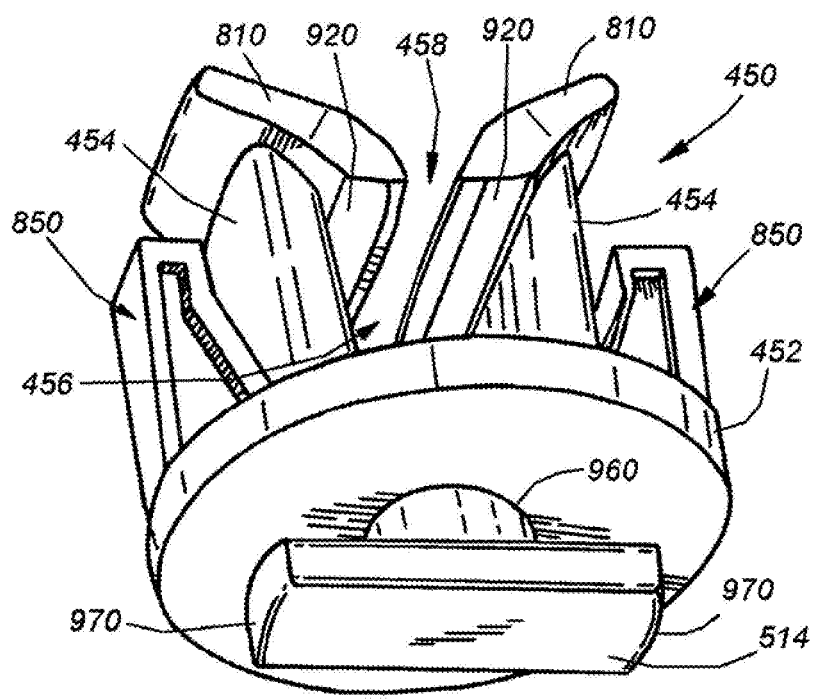
FIG. 9 is a bottom perspective view of the clip projection of FIG. 8.
Figure 10:
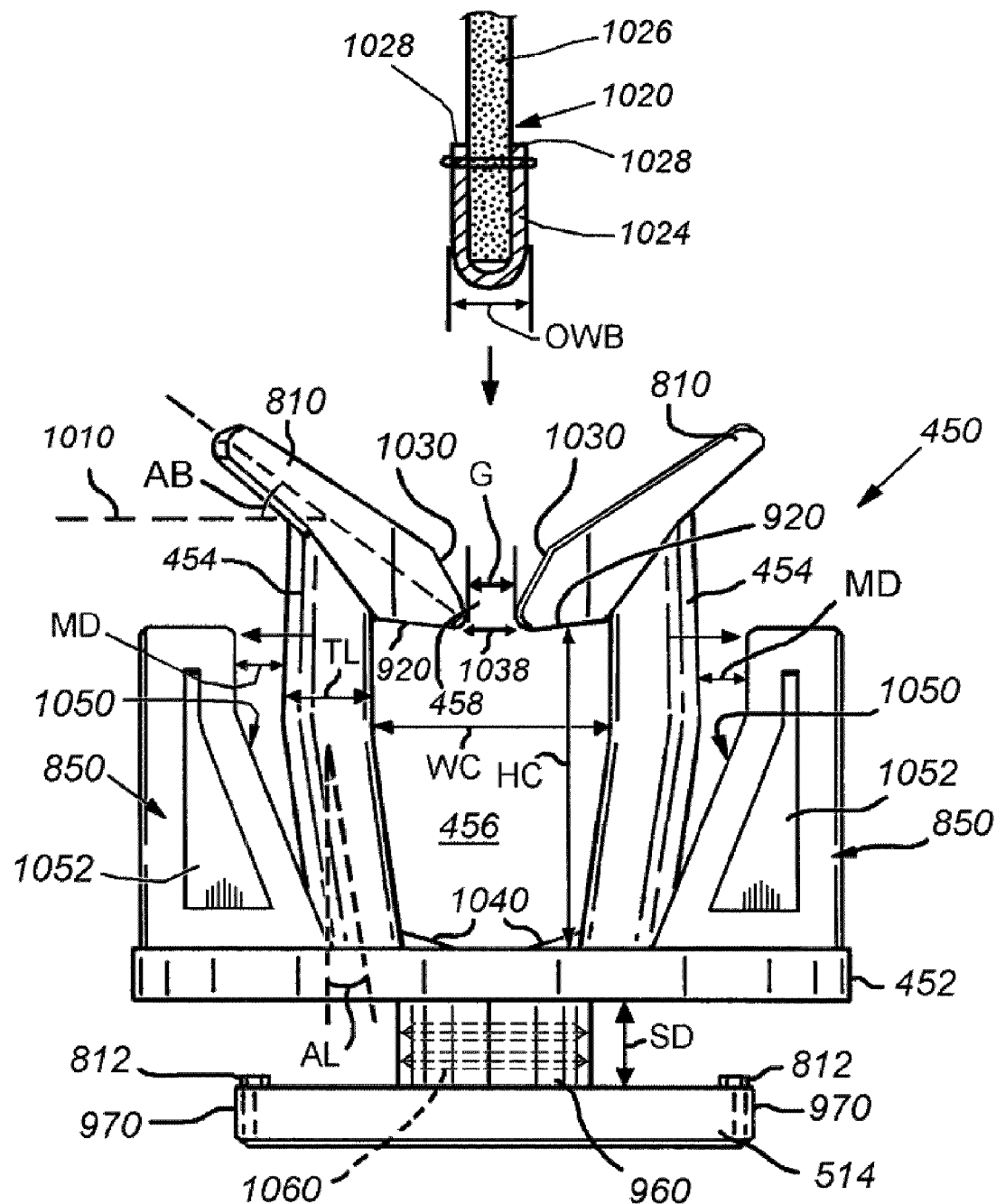
FIG. 10 is a side view of the clip projection of FIG. 8.

Reference is now made variously to FIGS. 8-10, which show the clip projection 450 of the illustrative embodiment in further detail. In these views, the clip projection 450 is removed from the base for clarity and to emphasize the removability and replacability of this component according to the illustrative embodiment. The clip projection includes legs 454 that are topped by opposing downwardly directed ramps 810. The ramps extend outwardly beyond the outer edges of the legs and inwardly to edges that define the gap 458. The gap has a resting distance G of approximately 0.5-1 millimeter. However this distance is highly variable, and is defined, in part, by the inward extension for the legs of a pair of barbs 920 that are actually the lower edges of the ramps 810. The ramps define an upper surface oriented at an approximate angle AB with respect to the horizontal plane (1010 being parallel to the bottom 452) that is between about 30 and 50 degrees. This angle allows downward force (arrow 1022) from an inserted bead 1020 (shown in phantom) to be resolved into lateral force (double arrow 1030) that flexes the legs 454 along their length to open the gap 458 sufficiently to allow the bead 1020 having an outer width OWB to pass therethrough. In this example, the bead is a piece of thickened, folded plastic 1024 stitched around at least one layer or ply 1026 of material that is joined to the trim cover. The tops 1028 of the bead are sized to bear against the barbs 920 when trapped within the cavity 456. In this example, the cavity has a maximum width WC of approximately 4-5 millimeters and a height HC of approximately 5-7 millimeters. The bead width ODB in this example is approximately 4 millimeters. Thus the gap distance G is spread approximately 3 millimeters by flexure. Again all measurements provided herein are merely exemplary, and sizes of all components herein can be varied to achieve desired results and accommodate a particular scale.

Note that the ramps 810 also include end segments that are disposed at a greater angle than AB with respect to the horizontal 1010. This further aids in directing the bead 1028 into the gap and resolving the downforce (arrow 1022) into a lateral, spreading force (double arrow 1030).

To further facilitate leg flexure in response to bead insertion, the legs include a lower portion disposed at an inwardly directed acute angle AL of between approximately 3 and 10 degrees in the illustrative embodiment. In addition, to reinforce the bottoms a pair of small webs 1040 is formed between the bottom 452 and inner faces of the legs. These webs and the angled lower portions further ensure that moderate flexure will not induce a stress crack or otherwise break a leg 454 away from the bottom 452. In this example, the legs have a width WL (See FIG. 8) of approximately 4-5 millimeters. Their thickness TL (See FIG. 10) is approximately 1-1.5 millimeters. Again these measurements are provided by way of example only and will vary based upon application and materials employed.

To even further resist possible breakage due to overstress, the legs 454 each confront a respective upright post 850 with an inner angled face 1050 that conforms generally to the outer face of each leg. Collectively, the upright posts 850 define a cradle that may/does progressively support the legs 454 so as to prevent single point stresses from forming in the legs. The inner face 1050 of each upright post 850 is particularly sized and arranged to engage an adjacent leg's inner face at a point of maximum allowed flexure to thereby "cradle" the legs and prevent breakage. The upright posts 850 are reinforced with interior webs 1052 and a solid, triangular outer frame to ensure strength and firm attachment to the clip bottom 452. The height and width of the upright posts 850 are highly variable, but should be sufficient to firmly back-up the legs without otherwise interfering with leg movement during flexure. While some possibility of overstress of the legs exists during application of the trim cover bead, a greater amount of overstress may be applied during the so-called "burping" process, in which the clip is forced downwardly as the substrate matrix is injected and allowed to harden with the clips submerged therein. The upright posts 850 particularly resist such overstress during the critical burping process.

The underside of the clip projection's bottom 452 includes the above-described key 514. The key 514 is mounted on a stem 960. The stem is centered with respect to the bottom 452 in this embodiment. It has an outer diameter that is no greater than the width of the base keyhole (512) to ensure it can rotate within the keyhole 512 as the key 514 is moved from a key-entry position to a stopped/rotationally locked position. As noted above, the stem has a spacing SD that is approximately 1-2 millimeters, matching the thickness of the base within the recess 510. Note that the ends 970 of the key 514 are radiused to facilitate rotation within the circular perimeter of the recess 510.

The stem 960 can be employed as a so-called "fusible link" that yields (e.g. breaks) in the event of excessive applied force. Under certain circumstances, during manufacturing and use, the ability for one or more clips to yield and release the cover may be highly desirable—for example, where an airbag must deploy from beneath a trim panel. Thus, an optional break-point 1060 (shown in phantom) is provided along the stem. The break-point in this example is a narrowed circumferential cut, but any weakening of the material in a predetermined point along the stem (or another part of the interconnection between the base and clip projection) can be employed. In alternate embodiments, the fusible link can comprise radial cuts or holes disposed around the stem perimeter or a centrally cored region that renders the stem into a hollow tube. Similarly, the weakened area can simply comprise a narrowed diameter stem that achieves the appropriate results. In general the weakened area should be tested by modeling and experimental techniques to optimize the balance between installation/holding strength and the yield strength.

Figure 11:
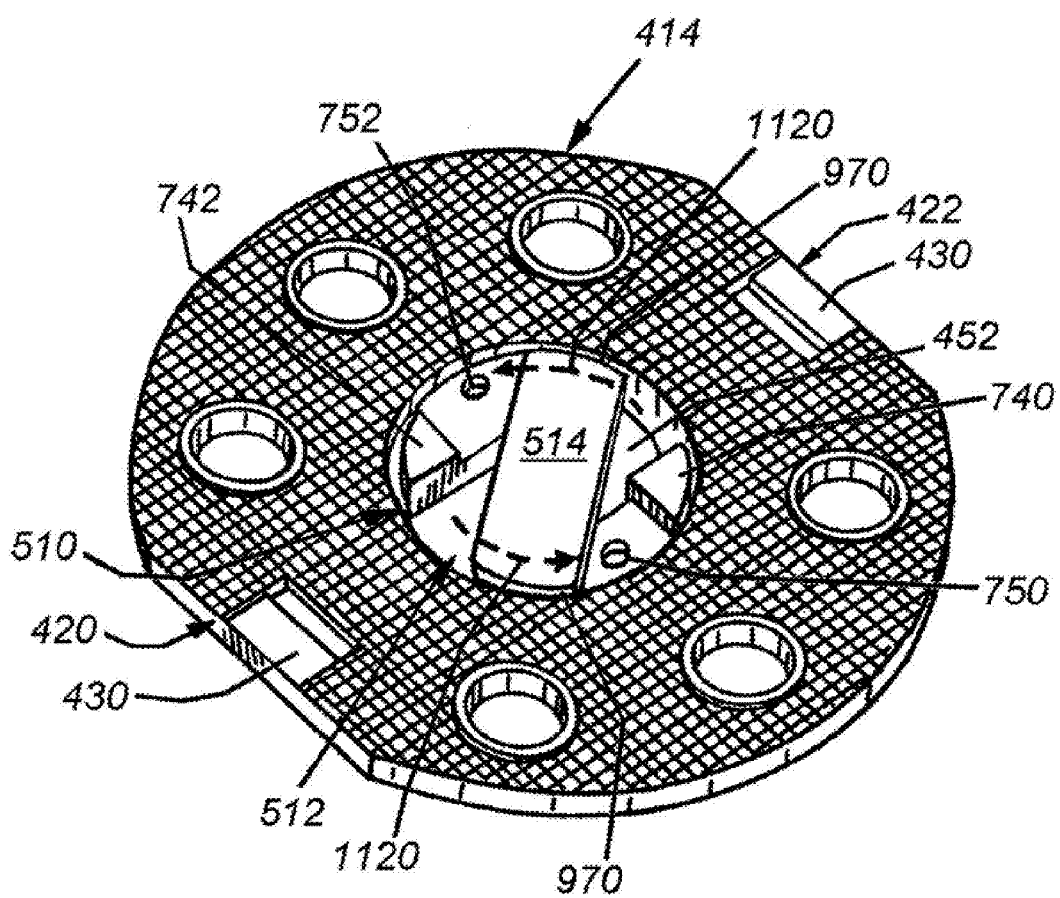
FIG. 11 is a bottom perspective view of the clip base of FIG. 4 detailing the insertion and rotational locking of the clip projection key within the recess.

Referring briefly to FIG. 11, the key 514 of the clip projection is shown inserted into the base 410. The cap (520 in FIG. 5 above) has been removed to reveal the recess 510. The key is being rotated (arrows 1120) from the key-entry position in which it passes through the keyhole 512 into the stopped position in which the key's nipples engage the detents 750, 752 as the key 514 engages the raised stops 740, 742. The detents and nipples generate a sensed "click" upon engagement, which provides the user with tactile feedback indicating proper alignment of the clip projection with respect to the base.

Figure 12:
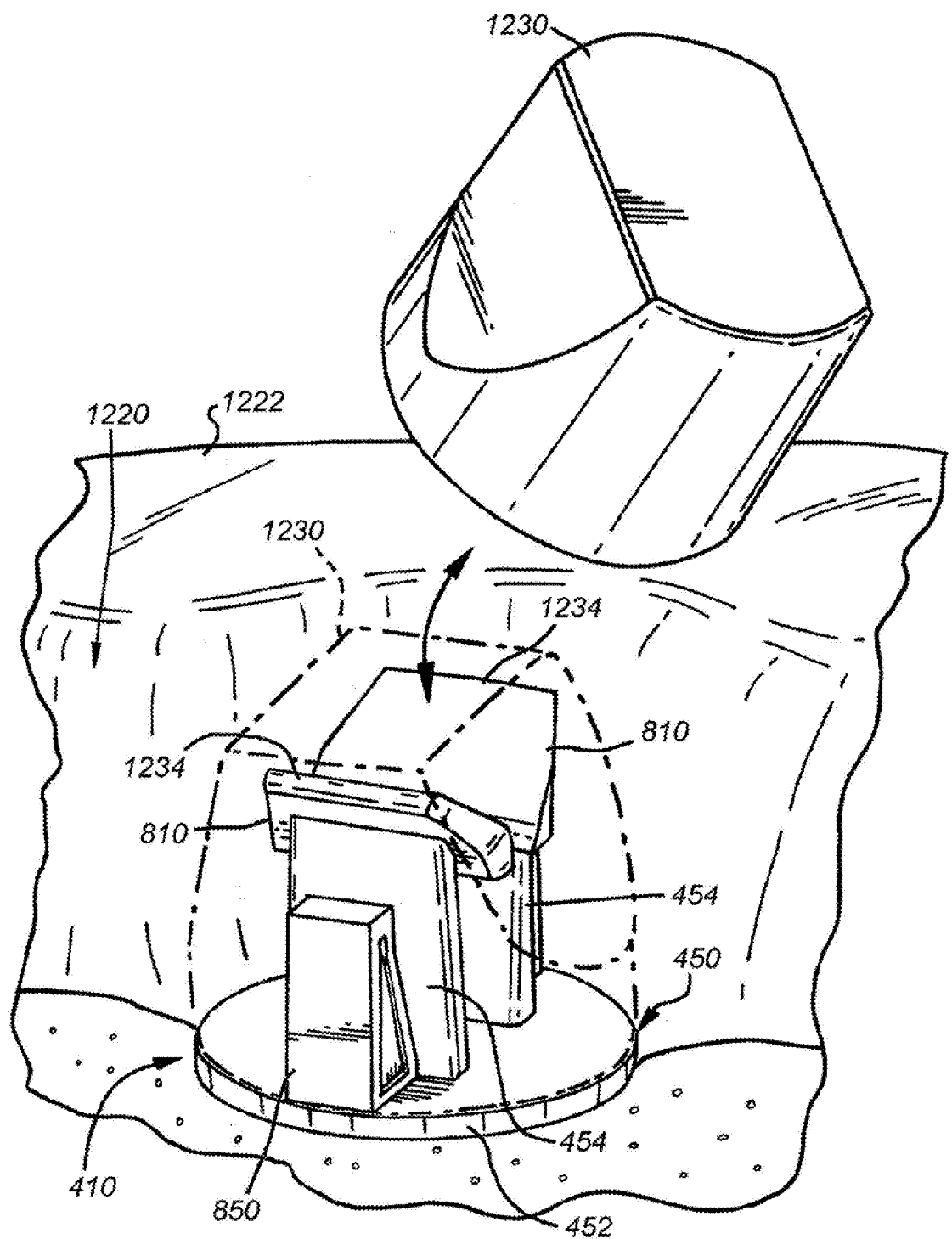
FIG. 12 is a fragmentary perspective view of a clip embedded in the trench of a foam substrate with an optional protective cap applied thereto.

FIG. 12 shows a clip 410 mounted within the trench 1220 of a hardened foam substrate material 1222. In this example, only the bottom 452 of the clip projection 450 is clearly visible, with the base and its raised center 610 being effectively submerged beneath the matrix. While careful molding may prevent the application of unwanted excess material, an optional cap 1230, typically constructed from a matrix-resistant material (or having a matrix-resistant coating, such as PTFE) can be mounted over selected clip projections as shown (in phantom). The cap may include inner detents (not shown) that lightly snap onto the outwardly extended ends 1234 of the ramps 810 to prevent the caps from backing off during molding. Once the matrix has hardened sufficiently, the caps 1230 may be removed manually or mechanically.

Figure 13:
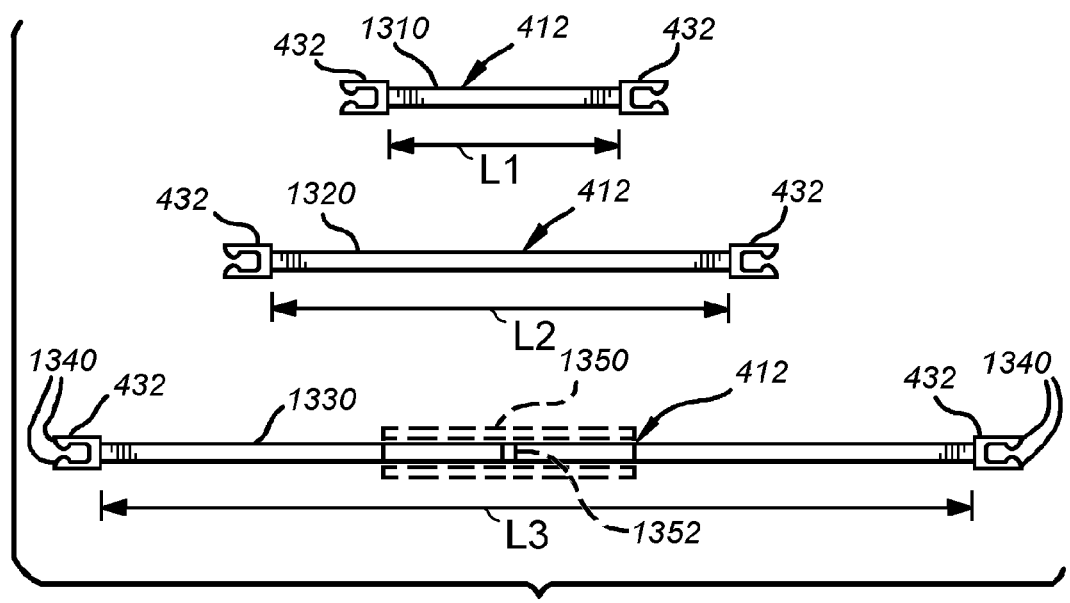
FIG. 13 is a side view of a plurality of double-ended connectors formed a variety of lengths.

As described above, the bases 414 of this embodiment may be connected together using flexible connectors 412 of varying length. FIG. 13 shows exemplary connectors 412 each having a connecting shaft length that varies in length. In this example, three lengths L1, L2 and L3 are provided to respective shafts 1310, 1320 and 1330. However and length is expressly contemplated. The length of the connecting shaft can be as little as a few millimeters and upward. Note that each U-shaped clamp end 432 includes a pair of inwardly directed nips that particularly engage conforming wells (see 790 in FIG. 7) in the base detents (430). The length of a given shaft can be infinitely varied by providing an optional connecting tube 1350 (shown in phantom). In this way a cut 1352 (shown in phantom) between ends of a shaft can be joined together to generate the exact desired length. In other words, a significantly long-length connecting shaft can be provided, and that long shaft can be cut-down to the appropriate length between the two halves. The two halves are then coupled with the connecting tube 1350. Clearly, a variety of optional connecting techniques and shaft arrangements can be employed according to alternate embodiments.

The connector 412 is constructed from flexible material having a rectangular, square, circular or ovular cross section with an average thickness/diameter of approximately 2 millimeters in this example. The thickness can varied based upon the material and degree of flexibility and/or axial torsion desired of the connector. An acceptable material for the connector can be similar to that used for the base. Once installed, the connector is typically an inert component. The connector's main purpose is to maintain the spacing between the clips while they are assembled into a substrate and assist in maintaining their level within the surface as the matrix hardens.

Figure 14:
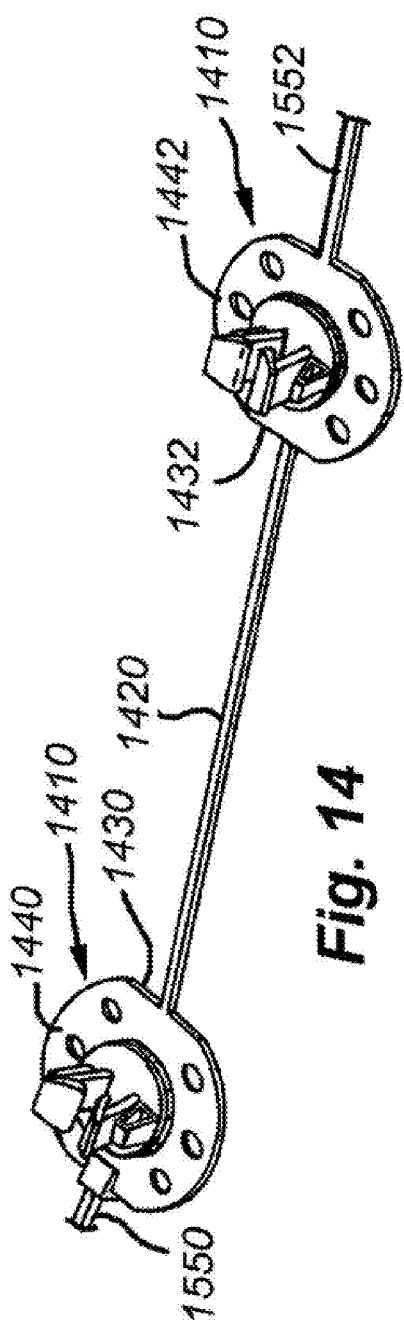
FIG. 14 is a top perspective view of a pair of chained clips having permanently attached connectors according to an alternate embodiment.
Figure 15:
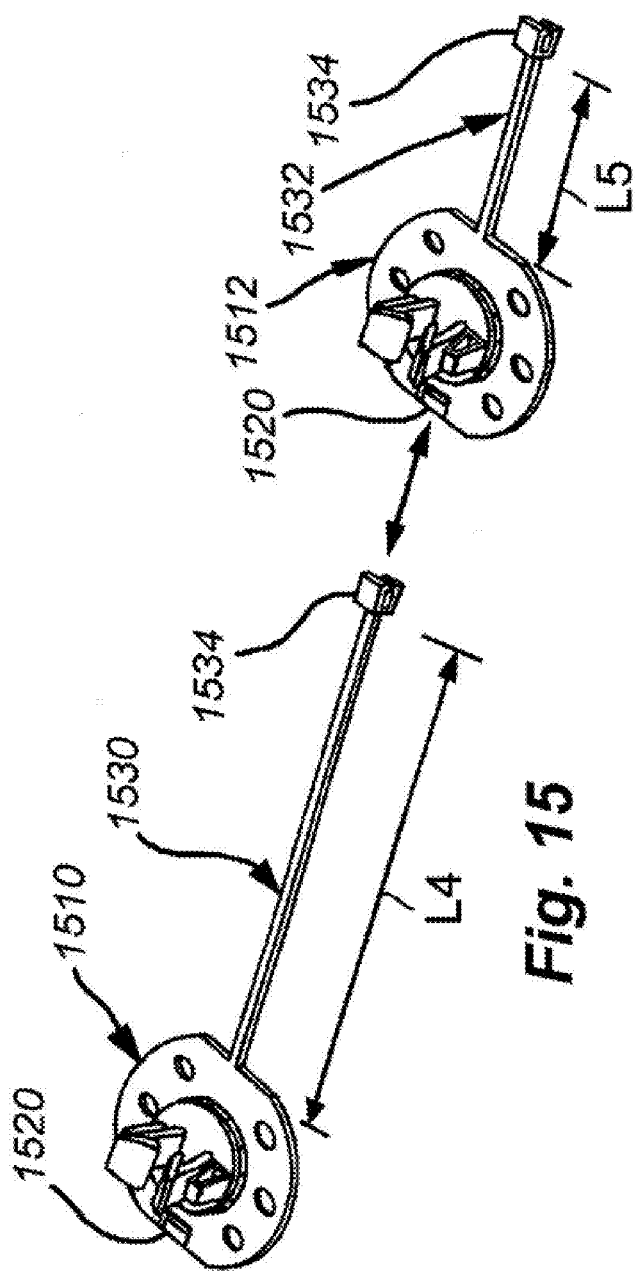
FIG. 15 is a top perspective view of a pair of clips each having a permanent connector extending from one end and adapted to removably engage an adjacent clip's detent formed on an opposing second end.

FIGS. 14 and 15 detail clip-connection techniques according to alternate embodiments. In FIG. 14, a pair of clips 1410, similar in construction to the clip 410 described above, are joined by a fixed-length shaft 1420. The shaft 1420 is fixedly attached to the end 1430, 1432 of each base 1440, 1442, respectively. The shaft 1420 can be formed as a unitary member when the bases 1440, 1442 are initially molded. Each base 1440 and 1442 can include an opposing shaft 1550 and 1552 that extends to an adjacent base (not shown) or other connection. In general, this arrangement is desirable where the spacing of clips is predetermined and produced in quantity. Alternatively, this arrangement can be applied to arrangements where mid-shaft connectors (see FIG. 13) are employed to vary the spacing between clips.

In FIG. 15, each clip 1510, 1512 includes a detent 1520 at one end and a fixedly attached connector 1530, 1532 and end-mounted U-shaped clamp 1534 at an opposing end. Each clip, thus defines a unitary connector and clamp that is sized and arranged t engage a detent on an adjacent clamp to thereby form a chain of clips. Note that the size of the predefined connectors can vary. For example a connector having a longer length L4 may be joined to a clip 1512 with a shorter connector length L5. In alternate embodiments, unitarily attached connectors may be infinitely varied for size by providing intermediate connectors (such as tube connector 1350) and appropriate shaft lengths.

Figure 16:
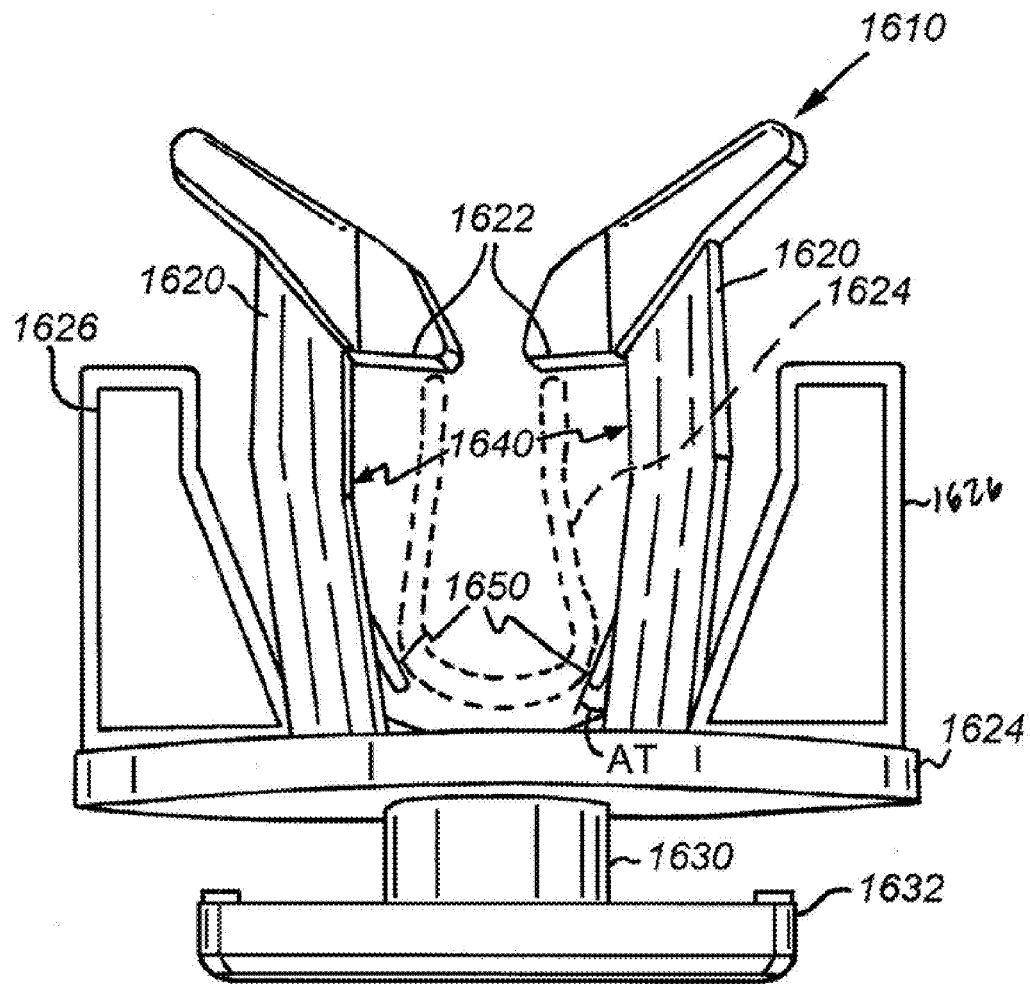
FIG. 16 is a side view of a clip projection having a pair of anti-rattle tabs according to an alternate embodiment of this invention.
Figure 17:
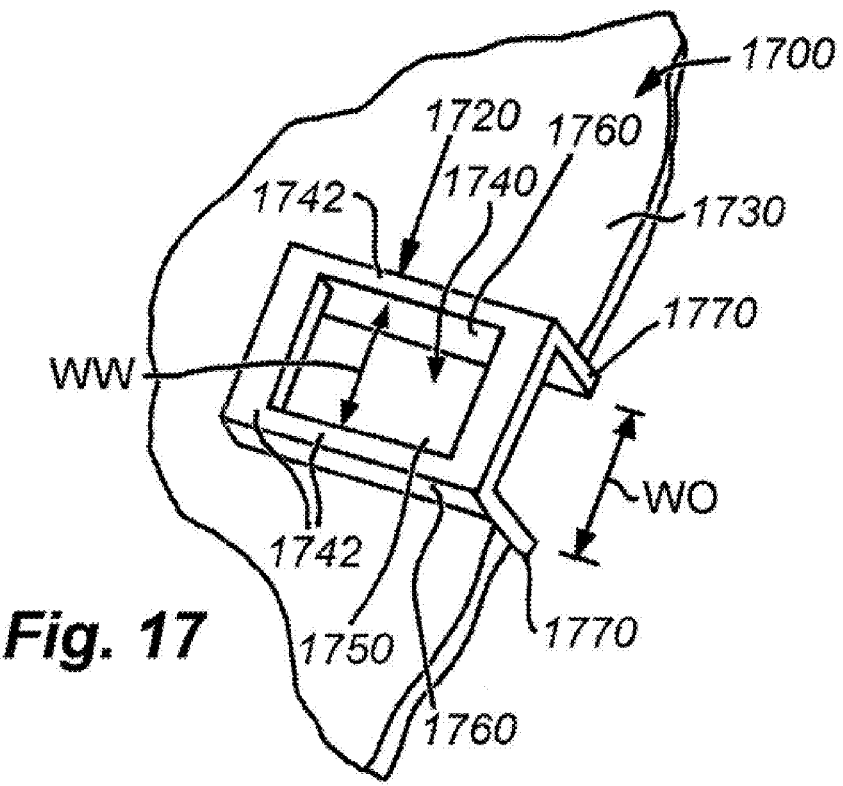
FIG. 17 is a fragmentary perspective view of a first side of a clip base having a connector socket according to an alternate embodiment.
Figure 18:
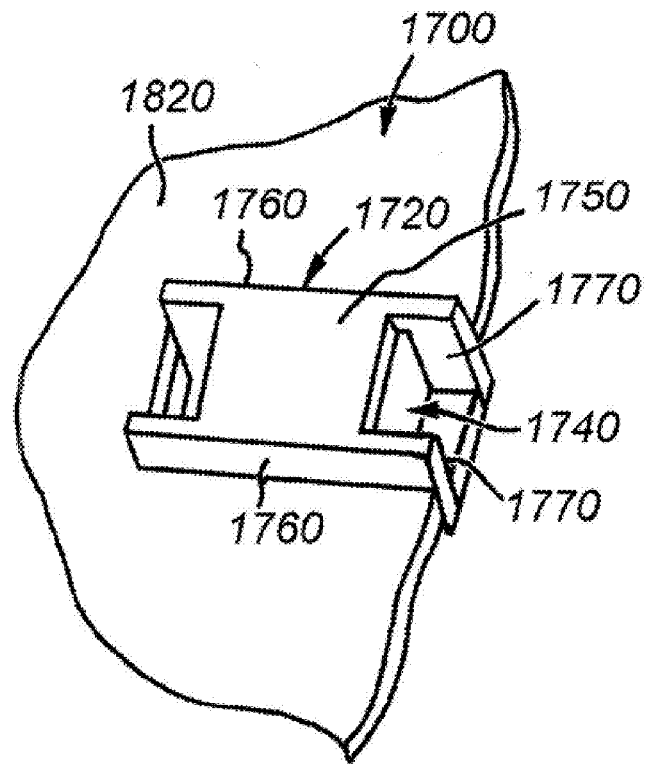
FIG. 18 is a fragmentary perspective view of a second, opposing side of the clip base and connector socket of FIG. 17.

Reference is now made to an alternate embodiment of the clip projection 1610 shown in FIG. 16. Various features of this clip projection 1610 are similar or identical to those of the embodiment shown and described above (see, for example clip projection 450 in FIGS. 8-12). Briefly, this clip projection includes a pair of opposing spring legs 1620 with barbs 1622 for capturing the plastic cover 1024 (shown in phantom and described above) of the trim bead. The legs 1620 extend from a bottom 1624. The legs 1620 are restrained against plastic deformation by upright posts 1626 that also extend from the bottom 1624, and function as described above. The bottom includes and oppositely projecting stem 1630 and key 1632 adapted to rotatably interlock with a base (see for example base 414 in FIGS. 6, 7 and 12 above). This base can be of a dissimilar material suited particularly for embedding in foam or another substrate, while the projection 1620 can be constructed from a material adapted for resilience and/or ease of replacement from the base if broken. The inner wall 1640 of each leg 1620 includes an ant-rattle tab 1650 according to this embodiment. Each anti-rattle tab 1650 particularly projects downwardly (toward the bottom 1624) and inwardly as shown from a location along the inner wall near its lower portion (near the bottom 1624). The tab is a molded piece of material that is unitary with the leg/clip projection. It can have a relatively thin side thickness (approximately 0.5-2 millimeters), a wider width (approximately 2-3 millimeters taken perpendicular to the figure page) and a length of approximately 2-5 millimeters (other lengths are contemplated. The tab 1650 is adapted to flex slightly against the bead cover 1024 to maintain it in place without excessive rattling during movement. Such movement can result from vehicle motion or the cyclic application of force due to a person sitting down and standing up. The acute projection angle of the tab AT with respect to the adjacent leg inner wall can be set to determine the amount of flexure and engagement between the cover 1024 and the tab 1650. A variety of projection angles and measurements for the tab, as well as placement locations along each inner wall are expressly contemplated. Note that while a pair of opposing anti-rattle tabs 1650 are provided in this embodiment, it is expressly contemplated that a single tab may be provided to one side only in an alternate embodiment. Likewise, more than two tabs can be provided variously to the legs in other embodiments.

Finally, FIGS. 17-20 show, variously a further alternate embodiment of a clip base 1710 according to this invention in which one or more sides are fitted with a socket structure 1720 for receiving a plug connector end used to gang or chain bases together in a manner described generally above. The precise shape and size of the socket 1720 is highly variable. In this embodiment a first side (top or bottom) 1730 of the base includes a rectangular window 1740 surrounded by a framework 1742 and an opposing floor 1750. In general, the socket includes a pair of upright (vertical) walls 1760 that extend trans-verse to the plane of the base on the first side and the second side 1820. The mouth of the walls 1760 includes an inwardly narrowed pair of shoulders 1770. In this example (highly variable) the shoulders define a mount width WO that is approximately 2.1 millimeters. Conversely inward of the mount, the width WW is wider (at least 2.5 millimeters in this example).

As shown in FIG. 19, the connector 1910 includes a shaft 1920 having an overall width WSS that is approximately 2 millimeters in this example. It includes a pointed/triangular end 1930 generally having the width WSS and also including a pair of unitary/molded spring loaded tabs 1940 that are normally in an outwardly extended position at an acute angle AE as shown. The fully extended width WET is greater than either WO or WS. Thus, as shown in FIG. 20, when the end 1930 is inserted into the socket 1720 past the shoulders 1770, the tabs flex (arrows 2020) into adjacent recesses and then snap partially back to assume the angle AC that is less than AE. This causes the ends 2060 of the tabs to bear against the inner abutments 2030 of the shoulders 1770, thereby preventing pullout of the end 1930 from the socket 1720, but otherwise allowing a good degree of lateral and axial play to ensure flexure of the connector with respect to the base.

The foregoing has been a detailed description of illustrative embodiments of the invention. Various modifications and additions can be made without departing from the spirit and scope thereof. For example, it is expressly contemplated that the clip projection and the base may be formed of similar (or identical) materials, and be made removable for replacement of damaged clip projections. Likewise, the clip projection may be removably attached to the base using alternative attachment mechanisms, such as a plug-in (non-rotational) arrangement or an attachment mechanism that employs a separate locking member. Accordingly, this description is meant to be taken only by way of example, and not to otherwise limit the scope of the invention.

What is claimed is:

1. A system for securing a trim cover bead to a flexible substrate, the system comprising:
   a base adapted to adhere to the substrate material and including a keyhole, wherein at least one surface of the base defines a textured surface that is constructed and arranged to facilitate foam adhesion of the base to the substrate material and resist shearing of the base when molded into the substrate material, whereby a void of substrate material surrounding the base is minimized as the substrate material covers the textured surface of the base; and
   a clip projection having a pair of legs with top barbs that forms a cavity for trapping the bead when it is forcibly passed between the barbs, the clip projection including a key that removably mounts to the keyhole.

2. The system as set forth in claim 1 further comprising detents adjacent to the keyhole that secure opposing ends of the key when the key is rotated to engage the detents after the key is passed through the keyhole.

3. The system as set forth in claim 1 wherein the clip projection is constructed from a material that differs from a material from which the base is constructed.

4. The system as set forth in claim 1 wherein the base includes a first detent on a first end for removably engaging a first U-shaped clamp on a first end of a first elongated, flexible connector, the connector including a second end having a second U-shaped clamp.

5. The system as set forth in claim 4 wherein the base includes a second detent on a second end opposite the first end for engaging a second U-shaped end of a second elongated connector.

6. The system as set forth in claim 1 wherein the base includes a first detent on a first end for removably engaging a first U-shaped clamp on a first end of a first elongated, flexible connector, the connector including a second end permanently attached to another base adapted to adhere to the substrate material and including a keyhole and another clip projection having a pair of legs with top barbs that forms a cavity for trapping the bead when it is forcibly passed between the barbs, the another clip projection including a key that removably mounts to the keyhole.

7. The system as set forth in claim 1 wherein the keyhole is surrounded by a recess on a side of the base opposite a side that faces the clip projection and wherein the recess is constructed and arranged to removably receive a cap that covers the recess to resist infiltration of the substrate material in a liquid state.

8. The system as set forth in claim 7 wherein the key is rotatably locked to the base.

9. The system as set forth in claim 1 further comprising a cradle that includes a pair of upright posts, each of the posts being located adjacent to each of the legs so as to limit flexure of each of the legs away from the other of the legs to a predetermined spread distance whereby risk of damage from excessive flexure is reduced.

10. The system as set forth in claim 1 wherein each of the barbs is located at an angle that optimizes flexure of the legs away from each other in response to a predetermined level of downward force applied by the bead thereupon while passing therebetween.

11. The system as set forth in claim 1 further comprising a covering cap constructed and arranged to be removably applied to the clip projection so as to insulate the clip projection from infiltration of the substrate material in a liquid state.

12. The system as set forth in claim 1 wherein the base includes a plurality of holes formed therethrough on an enlarged surface area so as to limit side-to-side shear of the base when the base is mounted in the substrate.

13. The system as set forth in claim 1 wherein the key is attached to a fusible link that is constructed and arranged to yield in response to a predetermined force applied thereto so as to provide a safety mechanism for release of the clip projection from the base.

14. The system as set forth in claim 1 further comprising an anti-rattle tab respectively mounted to one of the legs and projecting downwardly at an acute angle with respect to an inner wall of the one of the legs.

15. The system as set forth in claim 1 further comprising a pair of anti-rattle tabs, each of the tabs respectively mounted to one of the legs and projecting downwardly at an acute angle with respect to an inner wall of each of the legs.

16. A system for securing a trim cover bead to a flexible substrate, the system comprising:
   a base constructed from a first material adapted to adhere to the substrate material; and
   a clip projection having a pair of legs with top barbs that forms a cavity for trapping the bead when it is forcibly passed between the barbs, the clip projection being constructed from a second material that includes enhanced mechanical strength with respect to the first material, the clip projection being joined to the base;
   wherein at least one surface of the base defines a textured surface to facilitate foam adhesion of the base to the substrate material, whereby a void of substrate material surrounding the base is minimized as the substrate material infiltrates the base, to resist shearing of the base when molded into the substrate material.

17. The system as set forth in claim 16 wherein the clip projection is removably mounted with respect to the base.

18. The system as set forth in claim 16 wherein the base and the clip projection are each constructed by a process that includes a two-shot molding process comprising the steps of (a) molding one of the clip projection and the base; and (b) molding the other of the clip projection and the base over the one of the clip projection and the base.

19. The system as set forth in claim 16 further comprising a pair of anti-rattle tabs, each of the tabs respectively mounted to one of the legs and projecting downwardly at an acute angle with respect to an inner wall of each of the legs.

20. The system as set forth in claim 16 wherein the base includes a socket on at least one edge thereof having a pair of upright walls with shoulders that define inwardly offset abutments and a connector having an end constructed and arranged for insertion into the socket and including a pair of spring-loaded tabs that allow passage through the shoulders and thereafter become engaged with the abutments to restrict pullout of the ends.

21. A system for securing a trim cover bead to a flexible substrate, the system comprising:
   a base constructed from a first material adapted to adhere to the substrate material; and
   a clip projection having a pair of legs with top barbs that forms a cavity for trapping the bead when it is forcibly passed between the barbs, the clip projection being constructed from a second material that includes enhanced mechanical strength with respect to the first material, the clip projection being joined to the base; wherein at least one surface of the base is textured to facilitate foam adhesion of the base to the substrate material, whereby a void of substrate material surrounding the base is minimized;
   wherein the at least one surface of the base is formed with a checkered texture.

22. The system as set forth in claim 1 wherein the at least one surface of the base is formed with a stippled texture.

* * * * *